(12) United States Patent
O Tsuka et al.

(10) Patent No.: US 6,683,693 B1
(45) Date of Patent: *Jan. 27, 2004

(54) TARGET DEVICE

(75) Inventors: Hisao O Tsuka, Tokyo (JP); Masahiro Ohishi, Tokyo (JP); Hitoshi Sadachika, Tokyo (JP)

(73) Assignee: Kabushiki Kaisha TOPCON (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/574,490

(22) Filed: May 19, 2000

(30) Foreign Application Priority Data

May 21, 1999 (JP) .......................... 11-142490

(51) Int. Cl.[7] .............................. G01B 11/14
(52) U.S. Cl. ..................................... 356/620
(58) Field of Search ................ 359/515, 527, 359/529, 530; 356/3.01–5.05, 9, 11, 14, 152.3, 615, 620; D10/61; 473/170–196; D22/113

(56) References Cited

U.S. PATENT DOCUMENTS

| | | | |
|---|---|---|---|
| 5,181,719 A | * 1/1993 | Cleveland, III | 273/409 |
| 5,267,014 A | * 11/1993 | Prenninger | 356/152 |
| 5,589,981 A | * 12/1996 | Kasser et al. | 359/529 |
| 5,759,330 A | * 6/1998 | De Neefe | 156/248 |
| 5,759,671 A | * 6/1998 | Tanaka et al. | 428/166 |
| 6,019,375 A | * 2/2000 | West, Jr. | 273/378 |
| 6,055,490 A | * 4/2000 | Dunne | 342/95 |
| 6,060,157 A | * 5/2000 | LaPerre et al. | 428/212 |

* cited by examiner

Primary Examiner—Thomas G. Black
Assistant Examiner—Deandra M. Hughes
(74) Attorney, Agent, or Firm—Baker Botts LLP

(57) ABSTRACT

The present invention relates to a target device for use in a non-prism light wave range finder. In particular, the invention is concerned with a target device comprising a base portion and at least one reflective surface formed on the base portion, the reflective surface being constituted by a colored retroreflective sheet.

3 Claims, 8 Drawing Sheets

TARGET DEVICE

BACKGROUND OF THE INVENTION

The present invention relates to a target device for use in a non-prism light wave range finder. In Particular, the invention is concerned with a target device comprising a base portion and at least one reflective surface formed on the base portion, with a colored reflective sheet as a retroreflective sheet being formed on the reflective surface.

A light wave range finder is generally an apparatus for indirectly measuring, with a light wave, a reflecting means installed in a target survey spot. A measuring light emitted from the light wave range finder is limited its output in terms of safety and electric power. Therefore, the reflecting means installed in the target survey spot is required to make an efficient reflection.

To meet this requirement, as reflecting means installed at the target survey spot there has been known a retroreflective means i.e., a corner-cube prism as a single prism and a reflective sheet configured by integrating micro-corner cube prisms. These reflecting means are configured so as to reflect incident light efficiently in the incident direction.

Recently, as a new light wave range finder, there has been developed a non-prism light wave range finder capable of measuring reflected light directly from a collimation target without using any reflecting means.

According to the configuration of such a non-prism light wave range finder, measuring light is emitted not continuously but as pulses. A laser diode (LD) is used as a light source which can emit a pulse light of a large output. Consideration is given also to safety and the power consumption is at a practical level.

In the non-prism light wave range finder, because of a large pulse output, the measurement of distance can be done even without using a reflecting means. Further, the use of a reflecting member will permit measurement of an extremely long distance.

In the non-prism light wave range finder, a measuring pulse light is emitted toward a target survey object such as a wall, then reflected light reflected directly from the target survey object is received, and the received signal is subjected to a signal processing and a numerical processing, thus permitting non-prism measurement.

The measuring light emitted from the non-prism light wave range finder is basically a collimated light and, for allowing the measuring light to reach a remote spot while suppressing its spread, it is emitted from the whole surface of an objective lens. Thus, the size of the measuring light is at least equal to the size of the objective lens and becomes wider as the distance increases. Such a measuring light is advantageous to the measurement of a uniform plane (for example, measurement of a natural object). Even if a plane to be measured has a certain degree of unevenness, it is possible to effect a uniform measurement.

In the case where the object of measurement is a lattice-like object, there arises the problem that reflected light from the lattice and reflected light from the background add together, making the measurement impossible. Where the background is near, it is possible to regard a midway distance as a centroid position and make measurement, but in case of measuring a road or the like there arises a serious problem that a measuring light irradiated surface tilts, and if there is included a strongly reflecting portion therein, a collimation center and the centroid position as the measurement center are very likely to be displaced from each other. This problem occurs unless the measurement is a true spot measurement.

SUMMARY OF THE INVENTION

The present invention relates to a target device for use in a non-prism light wave range finder. In Particular, the present invention aims at providing a target device comprising a base portion and at least one reflective surface formed on the base portion, with a colored reflective sheet as a retroreflective sheet being formed on the reflective surface. The reflective sheet as a retroreflective sheet formed on the reflective surface is colored.

BRIEF DESCRIPTION OF THE DRAWINGS

The drawings illustrate embodiments of the present invention, in which.

DESCRIPTION OF THE INVENTION

Embodiments of the present invention will be described herein under with reference to the drawings.

Figure 1A:
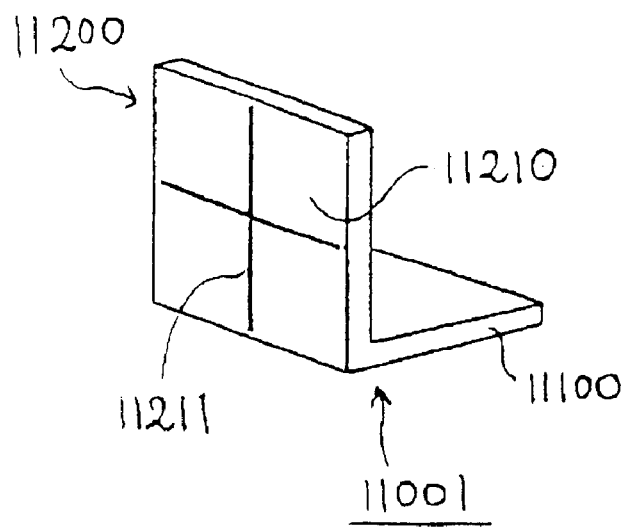
FIG. 1(a) illustrates a target 11001 according to the first embodiment of the present invention.

FIG. 1(a) illustrates an L-shaped target 11001 according to the first embodiment, which is made up of a base portion 11100 and a reflective surface 11200 formed in a direction orthogonal to the base portion 11100. The target 11001 is a reflective member for use in a non-prism light wave range finder 20000.

Figure 1B:
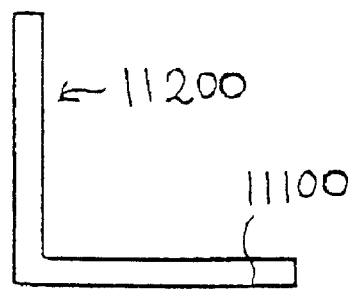
FIG. 1(b) illustrates the target 11001.
Figure 1C:
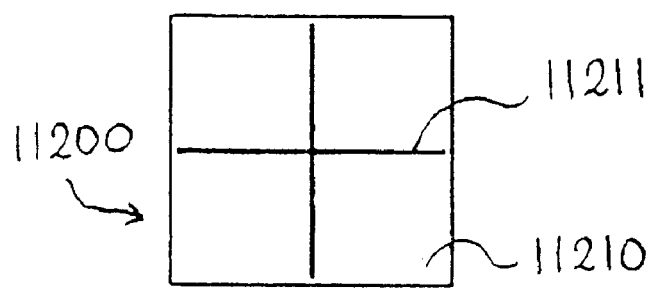
FIG. 1(c) illustrates the target 11001.
Figure 1D:
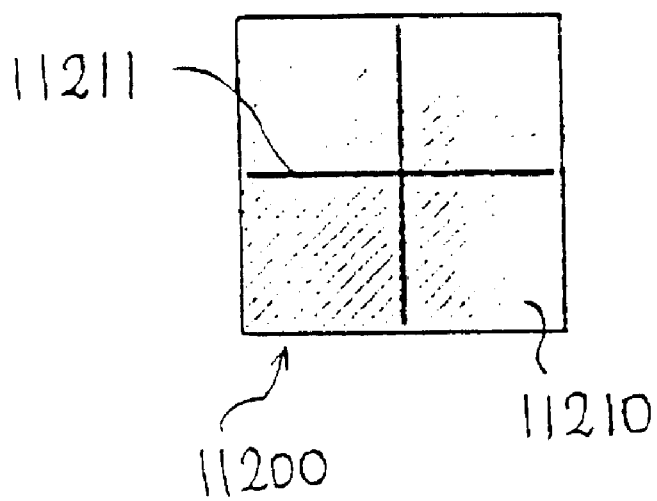
FIG. 1(d) illustrates the target 11001.

The base portion 11100 and the reflective surface 11200 are formed of a polymeric material such as a plastic material of a light weight. FIGS. 1(b), 1(c) and 1(d) are three-plane diagrams of FIG. 1(a), in which two planes are used for measurement. In FIG. 1(d), a reflective surface is formed, while in FIG. 1(c), the material of the base portion 11100 is used as it is, and cross-hairs are described. This is convenient for a use in which a measurement position is to be indicated. In FIGS. 1(d) and 1(c) there may be used reflective surfaces of different colors, respectively.

On the reflective surface 11200 is formed a reflective sheet 11210. The reflective sheet 11210 is a sealed type retroreflective sheet with fine glass beads embedded in the surface thereof. A matrix or base material to be sealed is colored and each bead has retroreflectivity optically.

An ordinary type of retroreflective sheet is a collection of micro-corner cube prisms of a high precision and it is formed transparently for enhancing the transmittance. At a glance, gray color is presented because light is reflected by a retroreflective plate of a high reflectance. Even if a center is indicated with cross-hairs or the like, it is very difficult to see because of gray color. Unlike a target using an ordinary reflective sheet, the reflective sheet 11210 used in this first embodiment is low in retroreflectivity, but when colored, it affords a good visibility for the cross-hairs and the target.

On the reflective sheet 11210 are formed black cross-hairs 11211, which are for facilitating the collimation of a target center of the target 11001.

The reflective sheet 11210 may be colored in a suitable color such as orange, red, black, or white, as shown in FIG. 1(d).

The color of the reflective surface may advantageously be selected to be similar to the color of the measurement light of the range finder.

Prolonging the measuring distance is not a direct object of the target 11001 of the first embodiment, but the target 11001 aims at specifying a measurement position and preventing a displacement of a collimation center.

It is in many cases at a low reflectance of an object of measurement that there occurs a displacement in the measurement using the non-prism light wave range finder 20000. In general, since the surface of an object diverges incident light, the amount of reflected light becomes smaller, and even in case of a well polished surface, the proportion of light reflected directly toward the range finder 20000 decreases.

Therefore, as to the reflective surface 11200 required for the target 11001 of this first embodiment, it is sufficient for the reflective surface to be formed of a reflective material of a low retroreflectivity having a certain degree of directivity.

Thus, the glass beads-embedded reflective sheet 11210 is advantageous in that it is easy to be processed and not influenced by directivity, although it is inferior in retroreflectivity to a reflective member using a prism. It is further advantageous in that by coloring a protective layer formed on the surface of the reflective sheet 11210 it is possible to freely select a conspicuous color from various colors.

Now, a description will be given below of a target 11002 according to the second embodiment of the present invention.

Figure 2:
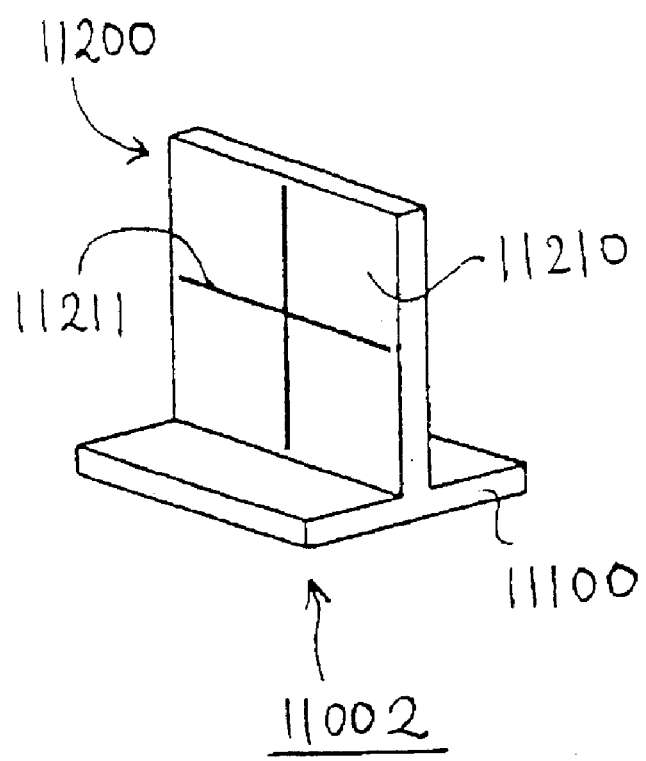
FIG. 2 illustrates a target 11002 according to the second embodiment of the present invention.

FIG. 2 illustrates the target 11002, which is made up of a base portion 11100 and a reflective surface 11200 formed in a direction orthogonal to the base portion 11100.

The base portion 11100 and the reflective surface 11200 are formed of a polymeric material such as a plastic material of a light weight. In this second embodiment, the target 11002 is T-shaped in side view and is formed integrally.

On the reflective surface 11200 is formed a reflective sheet 11210, with black cross-hairs 11211 being formed on the reflective sheet 11210. The reflective sheet 11210 may be colored in a suitable color such as orange, red, black, or white.

Other constructional points and effects of the second embodiment thus configured are the same as in the first embodiment and therefore explanations thereof are here omitted.

Reference will be made below to a target 11003 according to the third embodiment of the present invention.

Figure 3:
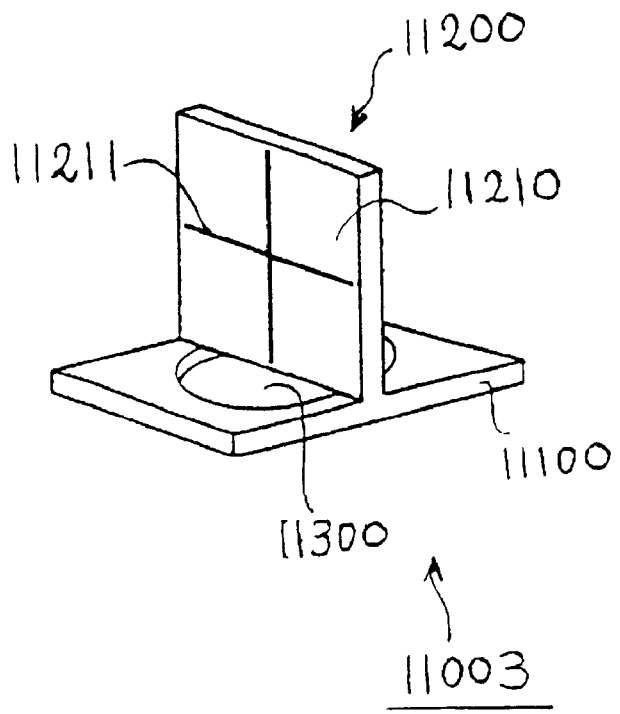
FIG. 3 illustrates a target 11003 according to the third embodiment of the present invention.

FIG. 3 illustrates the target 11003, which is made up of a base portion 11100, a reflective surface 11200 formed in a direction orthogonal to the base portion 11100, and a hole 11300 formed in the base portion 11100.

The base portion 11100 and the reflective surface 11200 are formed of a polymeric material such as a plastic material of a light weight. In this third embodiment, the target 11003 is T-shaped in side view and is formed integrally.

A reflective sheet 11210 is formed on the reflective surface 11200, with black cross-hairs 11211 being formed on the reflective sheet 11210. The reflective sheet 11210 may be colored in a suitable color such as orange, red, black, or white.

The hole 11300 formed in the base portion 11100 permits the black cross-hairs 11211 of the reflective sheet 11210 to be positioned exactly on a measurement spot. Further, a user can check the target installed position exactly from above.

Other constructional points and effects of the third embodiment thus configured are the same as in the first embodiment, so explanations thereof will here be omitted.

The following description is now provided about a target 11004 according to the fourth embodiment of the present invention.

Figure 4:
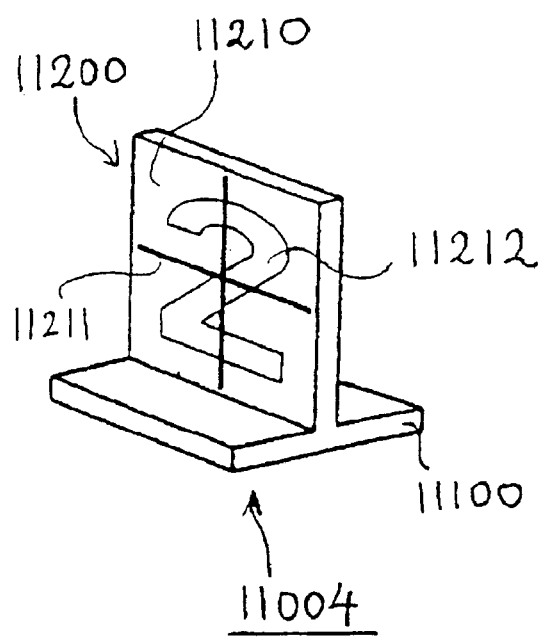
FIG. 4 illustrates a target 11004 according to the fourth embodiment of the present invention.

FIG. 4 illustrates the target 11004, which is made up of a base portion 11100 and a reflective surface 11200 formed in a direction orthogonal to the base portion 11100.

A reflective sheet 11210 is formed on the reflective surface 11200, with black cross-hairs 11211 being formed on the reflective sheet 11210.

A mark 11212 is formed on the reflective sheet 11210 for identifying the target from among plural targets. The mark 11212 is formed using a reflective sheet of a color different from the color of the reflective sheet 11210.

More specifically, the reflective sheet 11210 uses at least two colors, one of which may be used for the mark 11212.

The mark 11212 used in this fourth embodiment is a numeral, which permits easy distinction between measurement positions.

Other constructional points and effects of this fourth embodiment thus configured are the same as in the first embodiment, so explanations thereof will here be omitted.

Description will now be directed to a target 11005 according to the fifth embodiment of the present invention.

Figure 5:
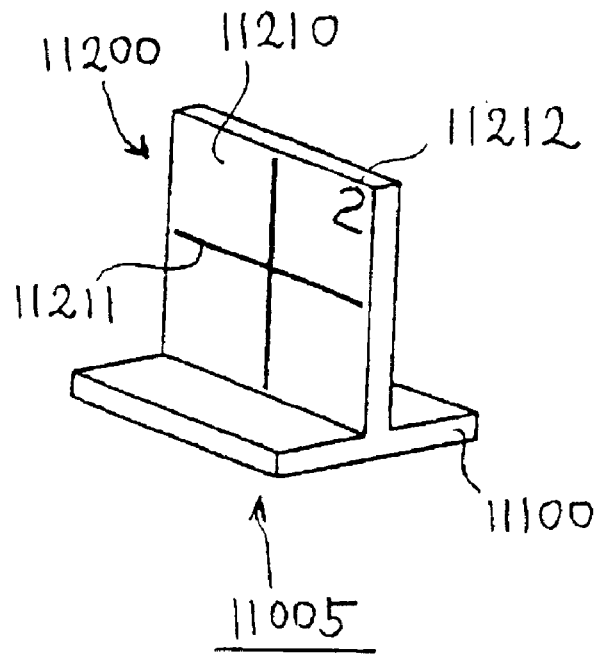
FIG. 5 illustrates a target 11005 according to the fifth embodiment of the present invention.

FIG. 5 illustrates the target 11005, which is made up of a base portion 11100 and a reflective surface 11200 formed in a direction orthogonal to the base portion 11100.

A reflective sheet 11210 is formed on the reflective surface 11200, with black cross-hairs being formed on the reflective sheet 11210.

A mark 11212 is formed on the reflective sheet 11210 for identifying the target from among plural targets. For example, the mark 11212 is formed in black color like the cross-hairs 11212.

The mark 11212 may be formed on part of the reflective surface 11200. In this fifth embodiment, the mark 11212 is formed at a right upper corner.

Other constructional points and effects of this fifth embodiment thus configured are the same as in the fourth embodiment, so explanations thereof will here be omitted.

A description will now be given of a target 11006 according to the sixth embodiment of the present invention.

Figure 6:
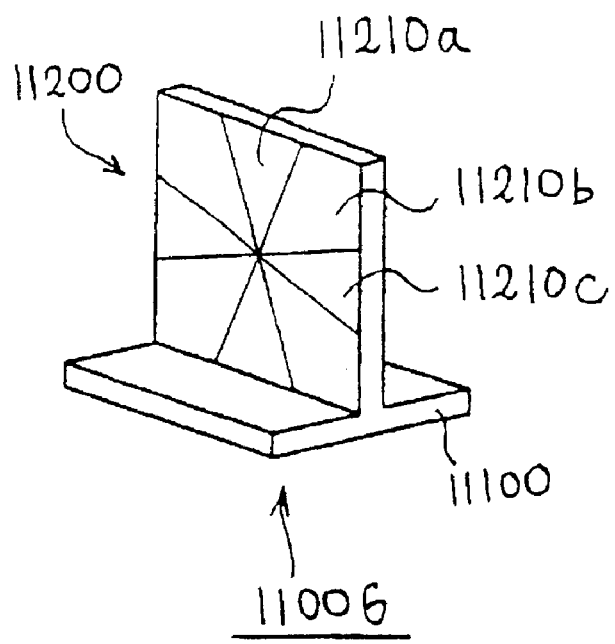
FIG. 6 illustrates a target 11006 according to the sixth embodiment of the present invention.

FIG. 6 illustrates the target 11006, which is made up of a base portion 11100 and a reflective surface 11200 formed in a direction orthogonal to the base portion 11100.

A reflective sheet 11210 is formed on the reflective surface 11200. The reflective sheet 11210 is colored in plural colors instead of the black cross-hairs 11211 used in the fifth embodiment, etc. More specifically, the reflective sheet 11210 used in this sixth embodiment is divided in different colors 11210a, 11210b, 11210c.

The division of colors may be in plural colors or may be in two colors. By utilizing a boundary line between at least two different colors of the reflective sheet 11210 it is made possible to indicate a collimation center position.

Other constructional points and effects of this sixth embodiment configured as above are the same as in the first embodiment, etc., so explanations thereof will here be omitted.

The above embodiments may be applied not only each alone but also in a suitable combination. Further, the color of the cross-hairs 11211, etc. is not limited to black color, but may be changed depending on the color of the reflective sheet 11210.

Reference will now be made below to a concrete application example of the above embodiments.

Figure 7:
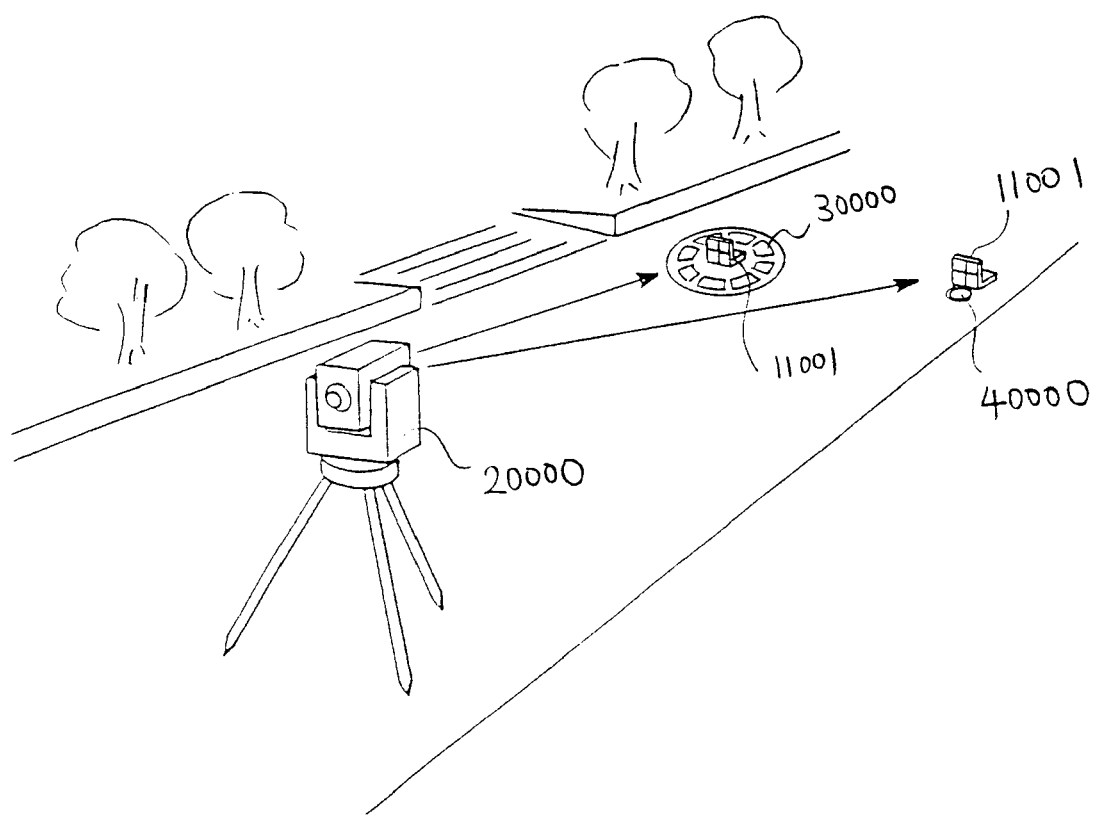
FIG. 7 illustrates how to use the target 11001.

FIG. 7 illustrates a case where target measurement spots located on a road are to be surveyed. In this example, a manhole 30000 on the road and a marker 40000 used in burying a gas pipe or the like are to be measured obliquely.

First, the target 11001 of the first embodiment is placed on each of the manhole 30000 and the marker 40000 used in burying a gas pipe or the like.

Next, a non-prism light wave range finder 20000 is installed on a known spot and collimation is performed for at least another one spot to specify a direction. Thereafter, the target 11001 as a collimation target is collimated.

Inclination of the road can also be measured by measuring three spots on the road arbitrarily.

By inputting the thus-surveyed numerical values onto a map it is possible to obtain positions on the map.

The target 11001 of the first embodiment may be substituted by other targets such as the targets of the second and third embodiments.

Figure 8:
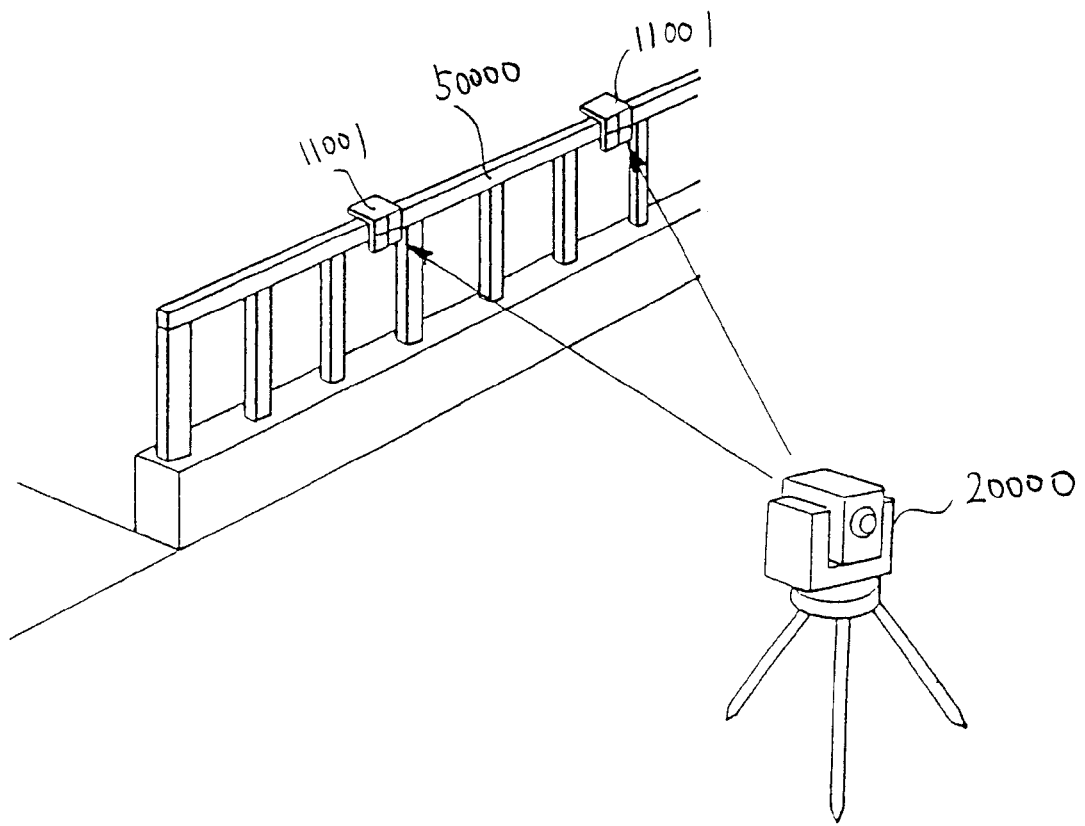
FIG. 8 illustrates how to use the target 11001.

Now, with reference to FIG. 8, a description will be given of a case where a fence 50000 or the like with many mid-spaces is to be measured. The target 11001 of the first embodiment is placed at each of predetermined positions of the fence 50000 and is then collimated for measurement. By measuring the target 11001 at several points it is possible to calculate an installed direction of the fence 50000 relative to a reference point. In this measurement it is necessary to install the non-prism light wave range finder 20000 at a known spot and collimate another known spot from the above mentioned known spot to specify a direction.

The targets 11001, 11002, and 11003 are formed using a light-weight material such as a plastic material. Conventional prisms are very expensive, while the target 11001, etc. formed of a plastic material can be obtained less expensively. Since the target 11001, etc. are thus inexpensive and light-weight, it is possible for the user to carry a large number of targets in the surveying work and hence possible to enhance the working efficiency.

The following description is now provided about the non-prism light wave range finder 20000 to be used for the target 11001, etc. according to the present invention.

Figure 9:
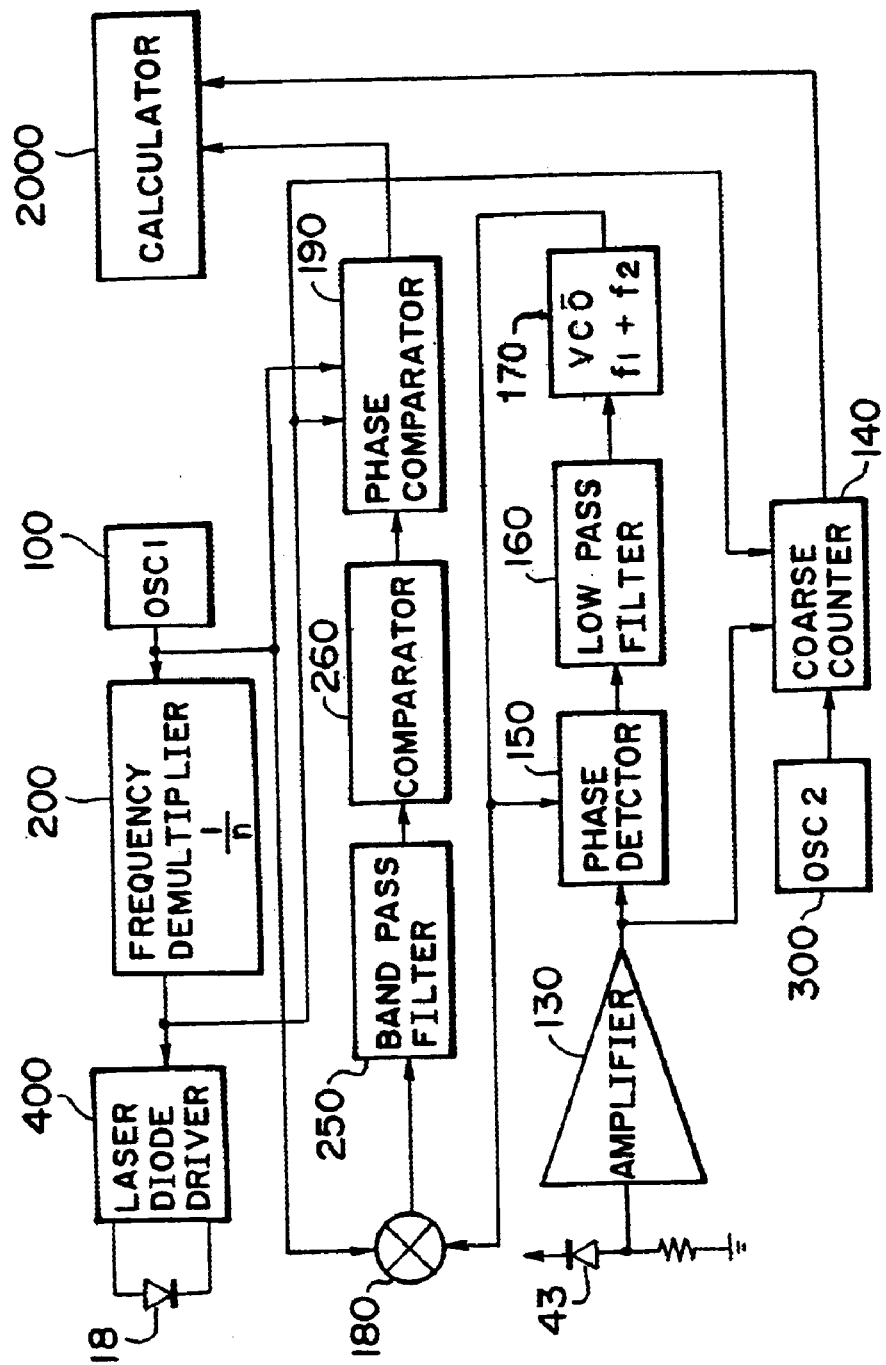
FIG. 9 illustrates an electrical configuration of a non-prism light wave range finder 20000.

FIG. 9 illustrates the configuration of the non-prism light wave range finder 20000. The non-prism light wave range finder 20000 is made up of a first crystal oscillator 100, a frequency divider 200, a second crystal oscillator 300, an optical system (see FIG. 10), a rough calculation counter 140, a phase detector circuit 150, a low-pass filter 160, a voltage-controlled oscillator 170, a mixer 180, a band pass filter 250, a comparator 260, a phase comparator circuit 190, and an arithmetic unit 2000.

The phase detector circuit 150, the low-pass filter 160, and the voltage-controlled oscillator 170 form a feedback loop. The mixer 180 mixes and detects an output signal provided from the voltage-controlled oscillator 170 and an output signal from the first crystal oscillator 100 and takes out a differential frequency. The phase comparator circuit 190 makes comparison between the phase of an output signal provided from the mixer 180 and that of an output signal from the frequency divider 200. The band pass filter 250 and the comparator 260 are for facilitating the phase comparison. The second crystal oscillator 300 and the rough calculation counter 140 constitutes a rough calculation counter means for making a rough measurement.

Figure 10:
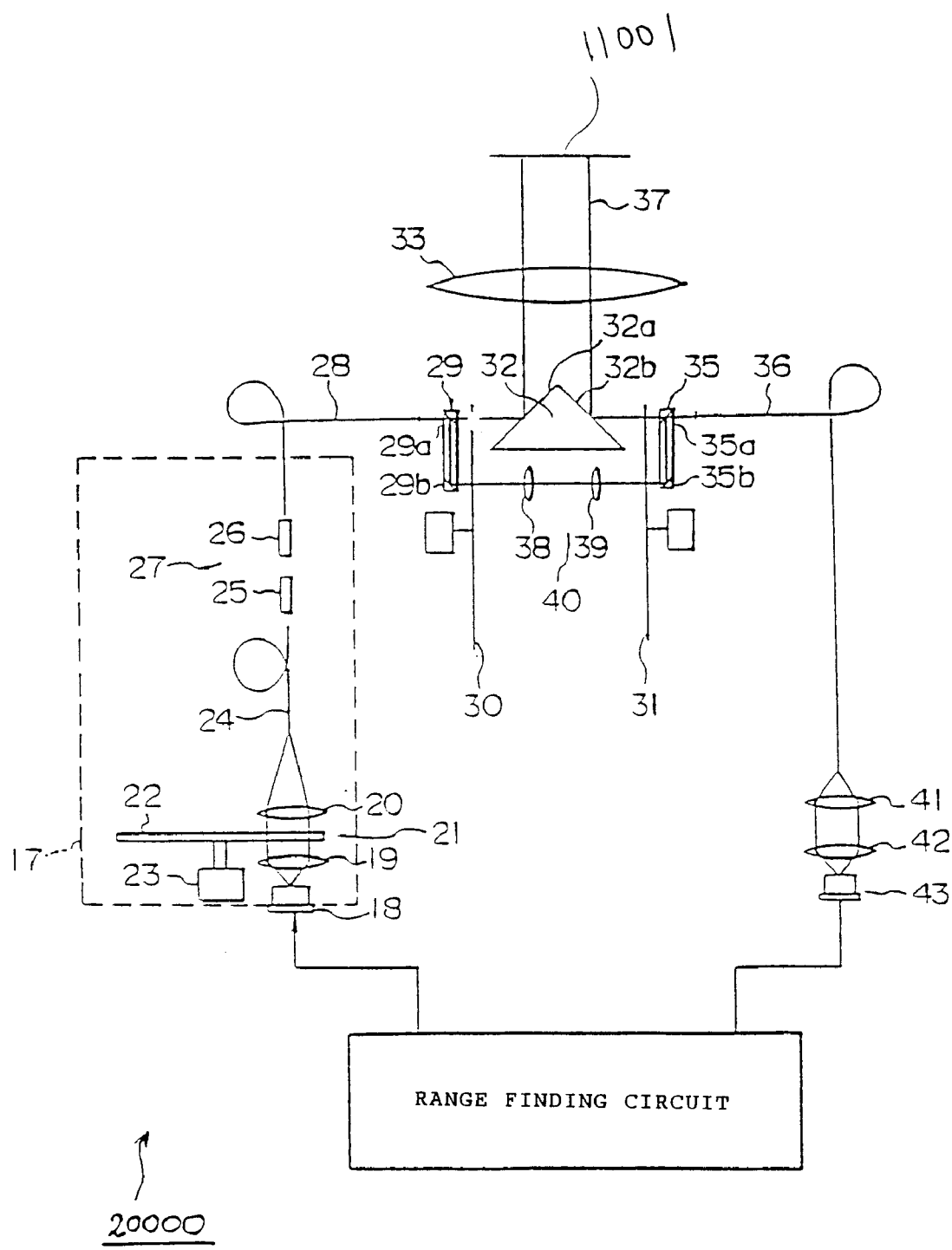
FIG. 10 illustrates a configuration of the non-prism lightwave range finder 20000.

Next, with reference to FIG. 10, an optical path of the non-prism light wave range finder 20000 will be described. The optical system is composed of a laser diode 18, an optical fiber 24, a chopper 30, a range finding optical path 37, an internal optical path 40, an objective lens 33, a light receiving-side fiber 36, a light receiving element 43, and a target 11001.

The target 11001 is a target object installed at a position spaced away from the body of the light wave range finder and functions to reflect light rays.

The laser diode 18, which is a pulse laser diode, has a relatively large peak power and can generate a pulse wave with a duty ratio of 0.01% or so. The light receiving element 43 is not specially limited if only it is an element capable of receiving a pulse light emitted from the laser diode 18. The chopper 30 is a switching unit for switching over the range finding optical path 37 and the internal optical path 40 from one to the other.

In the optical system configured as above, the light pulse emitted from the laser diode 18 passes through the optical fiber 24 and enters the chopper 30. At this time, if the chopper 30 has selected the range finding optical path 37, the light pulse passes through the objective lens 33 and is emitted from the range finder body. The thus-emitted light pulse is reflected by the target 11001 placed as a target object. The light pulse thus reflected by the target 11001 passes through the objective lens 34 and the light receiving-side fiber 36 and is applied to the light receiving element 43. These optical paths constitute the range finding optical path 37 which includes the distance to be measured between the range finder body and the target.

On the other hand, there is an optical path through which the light pulse emitted from the laser diode 18 passes through the optical path 40 and the light receiving-side fiber 36 and enters the light receiving element 43. This optical path is formed for the purpose of eliminating unstable factors generated within the range finder body.

In general, a range finder uses a large number of electronic components and delay times in the electronic components are apt to be influenced by a temperature change, etc., so that an unstable condition is likely to occur within the range finder body. In this connection, by making measurement in both the range finding optical path 37 and the internal optical path 40 and by obtaining a difference between the measured values, it is made possible to eliminate the unstable factor in the range finder body which is included in common to both optical paths.

The operation of the range finder being considered will now be described. The first crystal oscillator 100 generates a signal at a frequency f1 and this output signal is sent to the frequency divider 200, which in turn divides the inputted frequency f1 and outputs a 1/n frequency.

The output signal from the frequency divider 200 is sent to the rough calculation counter 140 as a start signal for the same counter. The output signal from the frequency divider 200 is also sent to a laser diode driver 400, which in turn causes the laser diode 18 to emit light.

The light pulse emitted from the laser diode 18 passes through the optical system and is outputted from the range finder body. The light pulse thus outputted is reflected by the target 11001 and is received by the light receiving element 43 disposed within the range finder. The incident light pulse is subjected to electric conversion in the light receiving element 43 and is amplified by an amplifier 130. An output signal (received pulse) from the amplifier 130 serves as a stop signal for the rough calculation counter 140. Clock signals are inputted from the second crystal oscillator 300 to the rough calculation counter 140, which counter counts clocks from the start signal (output signal of the frequency divider 200) up to the stop signal (output signal of the amplifier 130) and transmits data to the arithmetic unit 2000. The output signal (received pulse) of the amplifier 130 is also sent to the phase detector 150, and an output signal of the phase detector 150 is applied to a frequency control terminal of the voltage-controlled oscillator 170 via the low pass filter 160.

The phase detector 150, the low-pass filter 160, and the voltage-controlled oscillator 170 form a feedback loop, and the range finder is configured so that the output signal from the amplifier 130 and that from the voltage-controlled oscillator 170 are synchronized with each other.

An oscillation frequency, f1+f2, of the voltage-controlled oscillator 170 is selected so as to satisfy:

$$f2 = (1/n) * f1$$

The output signal from the voltage-controlled oscillator 170 is sent to the mixer 180, in which it is mixed and detected with the oscillation signal f1 provided from the first crystal oscillator 100, followed by wave shaping through the band pass filter 250 and the comparator 260, affording a differential frequency f2.

An output signal from the comparator 260 is transmitted to the phase comparator 190, in which the phase thereof is compared with that of the output signal provided from the frequency divider 200.

A description will now be given of the relation between the transmitted and received pulses and the relation between the output of the comparator 260 and that of the frequency divider 200. First, it is assumed that the chopper 30 has selected the range finding optical path 37. If the time required from the rise of output in the frequency divider 200, through the emission of light in the laser diode 18, until reflection and return of light pulse from the target 11001 is assumed to be $\Delta t$, a reception pulse appears in the output of the light receiving element 43 after the lapse of time $\Delta t$ from the rise of output in the frequency divider 200.

The voltage-controlled oscillator 170 is synchronized with the reception pulse, and a phase relation between the output of the voltage-controlled oscillator 170 and that of the light receiving element 43.

If the time $\Delta t$ is represented in terms of the output frequency (f1+f2) of the voltage-controlled oscillator 170, it is given as follows:

$$\Delta t = k/(f1+f2) + (\Delta\phi/2\pi) * (1/(f1+f2))$$

where k is an integer and $\Delta\phi$ is:

$$0 \leq \Delta\phi < 2\pi$$

and a shorter fraction time than one cycle of 1/(f1+f2) is represented in terms of a phase quantity, assuming 1/(f1+f2) to be one cycle.

The output of the voltage-controlled oscillator 170 is mixed and detected with the frequency f1 of the first crystal oscillator 100 in the mixer 180 and becomes f2 through the band pass filter 250. Further, it is wave-shaped into a square wave by the comparator 260 for easier phase comparison with the output of the frequency divider 200. The phase difference between the output of the comparator 260 and that of the frequency divider 200, which are compared with each other by the phase comparator 190, is equal to $\Delta\phi$ in the above expression.

Thus, $\Delta t$ can be determined by detecting k and $\Delta\phi$ in the above expression.

The integer k is obtained as a rough measured value by the rough calculation counter 140 and is sent to the arithmetic unit 2000.

The arithmetic unit 2000 combines the rough measured value obtained by the rough calculation counter 140 and a precise measured value obtained by the phase comparator 190 and calculates a delay time. The rough calculation counter 140 counts clock signals generated from the second crystal oscillator 300.

Thus, no synchronization is made with the clock signals generated from the first crystal oscillator 100. Consequently, the emission of the laser diode 18, as well as reception pulses and start, stop signals, are not synchronized with the second crystal oscillator 300, either. Accordingly, a quantization error induced by the clock signals from the second crystal oscillator is diminished, and by averaging plural times of measurements, a longer cycle than the cycle of the second crystal oscillator 300 can be measured up to a value less than one clock.

On the other hand, in the precision measurement, it is impossible to measure a longer cycle than the cycle of the first crystal oscillator. Therefore, the arithmetic unit 2000 compares a value less than one clock in the rough measurement with the top digit in the precise measured value and adjusts the rough measured value, then adds this adjusted value and the precise measured value together. In this way there is obtained a measured value as a value to be obtained.

The measurement using the range finding optical path 37 is now over. Next, when the internal optical path 40 is selected by the chopper 30, a rough measured value ki and a phase difference $\Delta\phi$ i, corresponding to time $\Delta$ti required from the rise of output in the frequency divider 200 up to the appearance of a reception pulse in the output of the light receiving element 43, are determined in the same way as in the selection of the range finding optical path 37.

Further, a distance up to the target 11001 can be determined by subtracting the rough measured value ki and phase difference $\Delta\phi$ i in the internal optical path 40 from the rough measured value k and phase difference $\Delta\phi$ in the range finding optical path 37.

The present invention configured as above is a target device for use in a non-prism light wave range finder and is made up of a base portion and at least one reflective surface formed on the base portion, which reflective surface is constituted by a colored retroreflective sheet. This target device is advantageous in that a displacement of the collimation center can be prevented.

What is claimed is:

1. A target device for use in connection with a non-prism light wave range finder, comprising a base portion for supporting the device at a measuring position, and at least one reflective surface at a measuring position supported on said base portion for reflecting a measuring light, said reflective surface comprising a mark drawn thereon for identifying the target device and a central line formed to indicate a central portion of said reflective surface, and retroflective sheet having at least one color which is selected to enhance visibility of said central line and/or said mark and wherein said reflective surface has at least one color portion of a low retroreflectivity.

2. A target device according to claim 1, wherein said base portion and said reflective surface are substantially formed in a L shape.

3. A target device according to claim 1, wherein said base portioned said reflective surface are substantially formed in a T shape.

* * * * *